United States Patent [19]

Romero et al.

[11] Patent Number: 5,686,370
[45] Date of Patent: Nov. 11, 1997

[54] ZEOLITE CATALYST WITH CHROMIUM FOR THE PRODUCTION OF GASOLINES WITH LOW AROMATIC CONTENT AND HIGH OCTANE NUMBER

[75] Inventors: Trino Romero, La Urbina; Nelson Martinez, Qta. Emily, both of Venezuela

[73] Assignee: Intevep, S.A., Caracas, Venezuela

[21] Appl. No.: 559,731

[22] Filed: Nov. 15, 1995

Related U.S. Application Data

[63] Continuation of Ser. No. 255,435, Jun. 8, 1994, abandoned.

[51] Int. Cl.$^6$ ...................................................... B01J 21/00
[52] U.S. Cl. ........................... 502/77; 502/60; 502/78; 502/79
[58] Field of Search ............................. 502/60, 71, 77, 502/78, 79, 64

[56] References Cited

U.S. PATENT DOCUMENTS

| | | | |
|---|---|---|---|
| 3,013,987 | 12/1961 | Castor et al. | 502/61 |
| 3,013,988 | 12/1961 | Bukata et al. | 502/79 |
| 3,236,910 | 2/1966 | Bukata et al. | 502/79 |
| 3,367,885 | 2/1968 | Rabo et al. | 502/79 |
| 3,383,169 | 5/1968 | Young | 502/79 |
| 5,186,918 | 2/1993 | Skeels et al. | 585/507 |
| 5,234,876 | 8/1993 | Swaroop et al. | 502/60 |

OTHER PUBLICATIONS

"Character of Distribution of $Cr^{3+}$ and $Cr^{5+}$"..., By A. A. Slinkin et al. Kinetike i Katliz, vol. 30, No. 1, pp. 184–192, Jan.–Feb. 1989.

"Radical Formation and Catalytic Activity of . . . ", By A.V. Kucherov et al. Kinetike i Kataliz, vol. 30, No. 1, pp. 193–201, Jan.–Feb., 1989.

"Various States of Cr Ions in Y and ZSM–5 Zeolites . . . ", By B. Wichterlova et al., Structure of Reactivity of Modified Zeolites, Copyright 1984.

Primary Examiner—Michael Lewis
Assistant Examiner—Thomas G. Dunn, Jr.
Attorney, Agent, or Firm—Bachman & Lapointe, P.C.

[57] ABSTRACT

A catalyst for production of high octane number gasoline having low aromatic content from a hydrocarbon feedstock containing n-paraffins includes a zeolite composition containing chromium in an amount of between about 0.1% to about 1.0% by weight of the catalyst, said chromium being located at acidic sites of said zeolite composition whereby aromatic forming reactions are inhibited. The catalyst is provided according to a process including sequential impregnation so as to position chromium at the acidic sites as desired.

9 Claims, 5 Drawing Sheets

ZEOLITE CATALYST WITH CHROMIUM FOR THE PRODUCTION OF GASOLINES WITH LOW AROMATIC CONTENT AND HIGH OCTANE NUMBER

This is a continuation of application Ser. No. 08/255,435 filed on Jun. 8, 1994 now abandoned.

BACKGROUND OF THE INVENTION

The invention relates to a zeolite catalyst with chromium for the production of gasolines with low aromatic content and high octane number.

Current legislation calls for the use of fuels having low concentration of environmental contaminants such as aromatics. Feedstocks which include appreciable amounts of n-paraffins when treated with conventional catalysts tend to yield large amounts of aromatics. Great interest exists, therefore, in developing a catalyst which minimizes the production of aromatics with little or no loss in octane number of the product.

Zeolite catalysts, particularly HZSM-5 zeolites having a high silica content, are well known for use in producing gasolines having a high octane number. These highly shape selective metallosilicate zeolites are also known, however, for aromatization reactions.

It is known to modify ZSM-5-type zeolite with a great variety of metals, including those of Group VIb of the periodic table of elements, so as to enhance the aromatization properties of the catalyst. U.S. Pat. No. 3,960,978 to Givens et al. disclose a process whereby a ZSM-5 zeolite modified with chromium is used. Givens et al. claim to reduce aromatization gradually. However, HZSM-5 zeolite with 0.046% chromium by weight transformed n-hexane so as to produce at least 80% aromatics. This process was only able to provide 10% aromatic production when propylene was used as the feedstock.

Slinkin et al. disclose an HZSM-5 zeolite catalyst with 0.75% chromium. This catalyst, when used to crack n-hexane, exhibited a reduction in aromatics production of 30%. However, the production of all other fractions suffered as well, and there was a significant decrease in octane number as compared to the product of an unmodified catalyst.

It is a principal object of the present invention to provide a catalyst for treating feedstocks containing n-paraffin wherein aromatics production is reduced.

It is a further object of the invention to provide such a catalyst wherein the octane number of the product is not significantly affected.

It is still another object of the invention to provide a process for preparing the catalyst of the invention.

Other objects and advantages will appear hereinbelow.

SUMMARY OF THE INVENTION

The foregoing objects and advantages are readily attained by the present invention.

The catalyst of the present invention comprises a zeolite composition containing chromium in an amount of between about 0.1% to about 1.0% by weight of the catalyst, said chromium being located at acidic sites of said zeolite composition whereby activity toward aromatic forming reactions is inhibited.

The process for preparing the catalyst in accordance with the invention comprises the steps of providing a zeolite composition, providing a solution of water soluble chromium salt in water having a chromium ion concentration corresponding to a desired concentration of chromium in said catalyst, providing a solution of water soluble ammonium salt in water, impregnating said zeolite composition with said ammonium solution to provide an ammonium impregnated zeolite, impregnating said ammonium impregnated zeolite with said chromium solution to provide an ammonium/chromium impregnated zeolite, drying and dehydrating said ammonium/chromium impregnated zeolite so as to provide a dried dehydrated zeolite and calcining said dried zeolite so as to provide said zeolite with pockets of chromium in $Cr^{3+}$ form at acidic sites of said zeolite catalyst.

BRIEF DESCRIPTION OF THE DRAWINGS

A detailed description of the preferred embodiments of the invention follows, with reference to the attached drawings, wherein.

DETAILED DESCRIPTION

Figure 1:
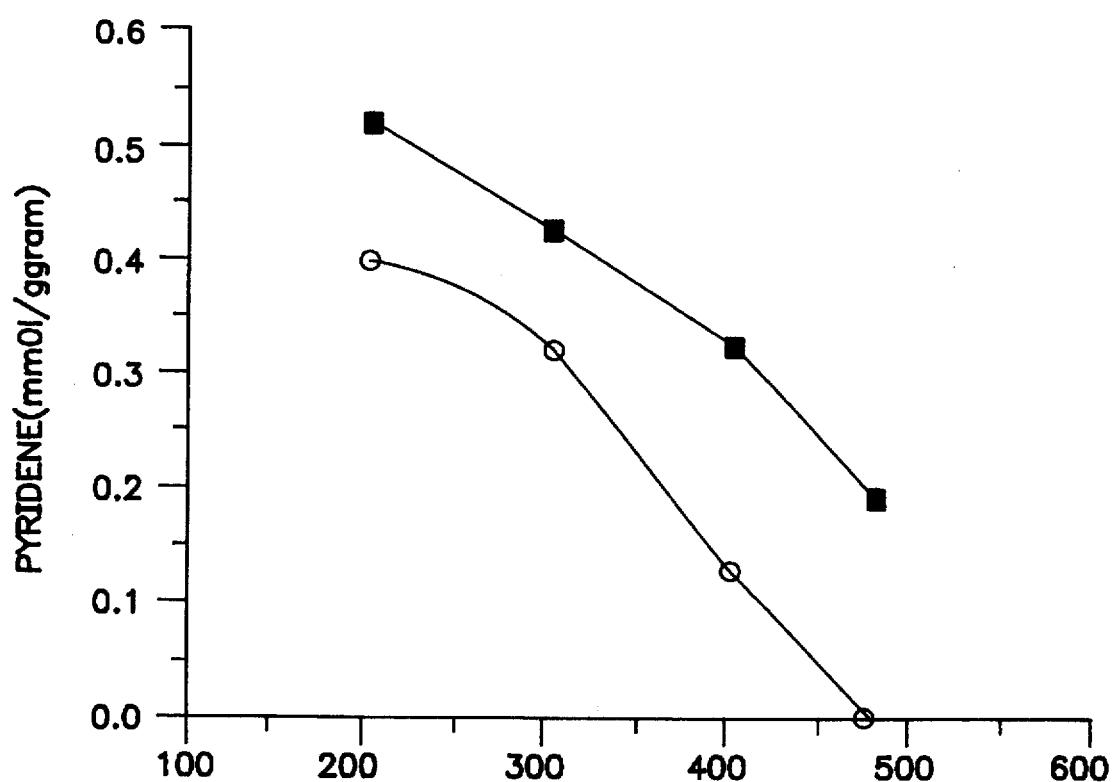
FIG. 1 illustrates the pyridine desorption of a catalyst according to the invention as compared to a conventional HZSM-5 catalyst.

The invention relates to the field of transformation of liquid hydrocarbon feedstocks into useful gasoline and gasoline additives having high octane numbers and low levels of aromatics and, particularly, to a catalyst for use in such a transformation and a process for preparing the catalyst.

Current legislation requires fuels to have a limited level of aromatics. Reduction of the levels of aromatics, however, typically also reduces the octane number of the product which is undesirable.

In accordance with the invention, a zeolite catalyst is provided which is treated with chromium so that pockets of chromium form on the surface of the catalyst and modify the acidic sites of the catalyst. Such acidic sites are responsible for catalysis of the aromatization reaction. Thus, the catalyst according to the invention has an excellent activity for desired reactions, while activity toward aromatization is inhibited. The catalyst of the invention is therefore particularly useful for cracking feedstocks having significant amounts of n-paraffin.

Suitable catalysts include ZSM-5 zeolite, HZSM-5 zeolite and mixtures thereof although, of course, numerous other zeolites and/or metallosilicates are available. The zeolite catalyst preferably has a $SiO_2/Al_2O_3$ molar ratio of at least about 46 and a surface area of about 360 $m^2/g$. A zeolite having a high ratio of silica to alumina may be referred to as a pentasil zeolite.

The catalyst in accordance with the invention contains chromium in an amount between about 0.1 to about 1.0% by weight of the catalyst, preferably between about 0.5 to about 0.75%, and most preferably about 0.5%. The chromium is preferably present in the form of $Cr^{3+}$ ions, and is present in pockets at the acidic sites of the catalyst while the remainder of the catalyst is preferably substantially free of chromium and is therefore active for the desired reactions.

The catalyst of the present invention is characterized by a low pyridine retention which indicates a modification of the acidic sites of the zeolite. The low pyridine retention is believed to be due to the chromium modification of the acidic sites of the catalyst. This modification, advantageously, serves to inhibit the activity of the catalyst as regards the aromatization reaction, thus providing a catalyst which is well suited to providing the desired low aromatic, high octane number gasolines and gasoline additives. Measurement of the aforesaid pyridine retention is illustrated in Example 2.

In accordance with the invention, the catalyst is prepared according to a process whereby the chromium is deposited on the catalyst in pockets of $Cr^{3+}$ ions at the acidic sites of the catalyst.

The catalyst is prepared by providing a suitable zeolite catalyst, preferably, ZSM-5 and/or HZSM-5. The zeolite catalyst preferably has a ratio of silica to alumina of at least about 46, and may be of the type referred to as pentasil zeolites, although other zeolites may be used. In accordance with the invention, the catalyst is treated or impregnated first with an ammonium solution and then with a chromium solution. Sequential impregnation is a key feature of the process of the invention, and serves to provide a catalyst having desired characteristics as discussed below. The impregnated catalyst is then dried and calcined.

Impregnating with ammonium followed by chromium causes the ammonium and chromium ions to compete for sites on the zeolite and the chromium binds with the most acidic sites on the zeolite surface as desired. This provides for the formation of small pockets of chromium located at the most acidic sites of the catalyst and surrounded by ammonium ions. The acidic sites are thereby modified so as to inhibit the activity of the catalyst toward aromatization reactions while the remainder of the catalyst, once ammonium is removed, is still active toward desired reactions.

The calcining step is believed to provide for migration of the chromium, in $Cr^{3+}$ ion form, to the surface of the catalyst, and further eliminates ammonium ions from the catalyst surface, thereby allowing the remaining sites to remain unaltered so as to preserve the activity of the catalyst toward the desired non-aromatization reactions which, in accordance with the invention, serve to provide the desired gasoline and gasoline additive end-products from cracking of n-paraffin containing feedstock.

The ammonium solution to be used for impregnation is preferably a solution of water soluble ammonium salt in water. The ammonium salt may preferably be selected from the group consisting of ammonium nitrate, ammonium acetate, ammonium oxalate and mixtures thereof. The ammonium solution also preferably has an ammonium ion concentration which is greater than the ion concentration of the chromium solution. The ammonium ion concentration is preferably between about 4 to about 7 times the chromium concentration.

The chromium solution is also preferably a solution of a water soluble chromium salt in water, and is preferably provided having a chromium ion concentration sufficient to provide the desired amount of chromium in the finished catalyst (i.e., 0.1–1.0% wt). Suitable chromium salts preferably include chromium nitrate, chromium oxalate, chromium acetate, chromium chloride and mixtures thereof. Of course, the foregoing are examples of suitable salt and other salts are certainly useful in accordance with the invention.

The actual impregnation steps may be carried out according to any of numerous known and conventional techniques. The important factor in accordance with the invention is the sequence of the impregnation.

After impregnation, the wet impregnated catalyst is dried at temperatures preferably below about 100° C. until substantially all free water is removed and/or evaporated.

The catalyst is then further dried at temperatures below about 125° C., preferably between about 100° C. to about 125° C., so as to allow decomposition of the salts.

The dried catalyst is then calcined in accordance with the invention at temperatures between about 450° C. to about 600° C. and preferably for a time sufficient to transform substantially all of the chromium to $Cr^{3+}$ ion form. As set forth above, the calcining step is believed to stimulate migration of chromium to the surface of the catalyst and also to stimulate removal of ammonium from the surface of the catalyst, all as is desired in accordance with the present invention.

As set forth above, the catalyst preferably has a chromium content of between about 0.1 to about 1.0% wt. The range is critical because at higher levels of chromium the size of the chromium pockets increases, the specificity of the acid site modification is lost, and the undesired aromatization reaction may in fact be stimulated. As demonstrated in the Examples, the amount of chromium is more preferably between about 0.5% to about 0.75% and is ideally approximately 0.5%.

The catalyst of the present invention may be used to crack n-paraffin containing feedstock at standard fluid catalytic cracking conditions. Such conditions may include a reaction temperature of between about 500 to about 600° C., and a retention time of about $70^{-1}$. The process provides a mixture of products having a high octane number and low concentration of aromatics as desired.

EXAMPLE 1

This example illustrates the process of the present invention for providing the desired catalyst. A commercial HZSM-5 zeolite having a $SiO_2/Al_2O_3$ molar ratio of about 46 and a surface area of about 360 m²/g was used as the starting catalyst.

To prepare 1000 g of the catalyst, a volume of 40 ml of a 1.8% (w/v) ammonium nitrate solution was added gradually to 1000 g of zeolite, mixing it slowly throughout the addition. To the resulting admixture, 60 ml of 1.5% (w/v) chromium nitrate solution were added as described above. The wet impregnated zeolite was dried overnight at 90° C. The temperature was then increased to 110° C. for 18 hours. The solid obtained was calcined at 500° C. for 12 hours. The solid was allowed to cool at room temperature after which the catalyst was ready for use.

The amount of chromium on the catalyst was determined by atomic absorption. A value of 0.5% by weight was obtained. An XPS analysis of the catalyst produced a signal at 576.9 eV which is characteristic of $Cr^{3+}$. No signal for $Cr^{5+}$ was detected.

EXAMPLE 2

This example illustrates the modification of the acid sites on the HZSM-5 zeolite. To determine the effect of the chromium on the acidity of the catalyst, a 0.1% chromium HZSM-5 catalyst was prepared. The acidity was determined gravimetrically with an electrobalance Cahn 1000, which was equipped with a gas distribution system, a vacuum system and temperature control. The catalyst sample was saturated at 30° C. with helium which was saturated with pyridine. The gas was purged and the amount of the pyridine absorbed irreversibly by the acid sites was determined at temperatures of 200° C., 300° C., 400° C. and 480° C.

The results obtained can be seen in FIG. 1. The incorporation of chromium onto the HZSM-5 zeolite reduced the number of acid sites. As temperature increased, the amount of pyridine in mmol/g of catalyst decreased. The decrease is proportional to the modification of the acid sites on the catalyst. This result indicates that the chromium is firmly bound to the strongly acidic sites on the catalyst which are believed to be responsible for the catalysis of aromatization reactions by HZSM-5 zeolite.

EXAMPLE 3

This example illustrates the effect of the chromium concentration of the catalyst on selectivity and activity during the transformation of n-heptane. The n-heptane used as a feedstock in this example was 99.8% pure and was used to simulate a conventional fluid catalytic cracking feedstock. The reaction was carried out in a microreactor at 480° C. with a retention time of 56 h$^{-1}$, so as to simulate standard operating conditions. The n-heptane was fed in pulse form and carried with $N_2$ in a n–$C_7$:$N_2$ molar ratio of 3. To determine the effect of the chromium concentration of the catalyst on the reaction products, four different chromium concentrations were tested in the range of 0 to 1.0% by weight of chromium.

Table 1 lists the values obtained for the activity of the catalyst expressed in mols of n-heptane transformed per second per gram of catalyst. The value remains practically unchanged by the increase in the chromium concentration of the catalyst.

TABLE 1

| % Chromium | Activity × 10$^{-5}$ mol/s/g | Composition of the Products | | | |
|---|---|---|---|---|---|
| | | $C_2$ | $C_3$ | $C_4$ | $C_5$+ |
| 0 | 2.2 | 0.6 | 12 | 26 | 62 |
| 0.1 | 3.1 | 0.4 | 11 | 29 | 58 |
| 0.5 | 3.0 | 0.5 | 14 | 35 | 51 |
| 1.0 | 2.3 | 0.3 | 11 | 31 | 58 |

Figure 2:
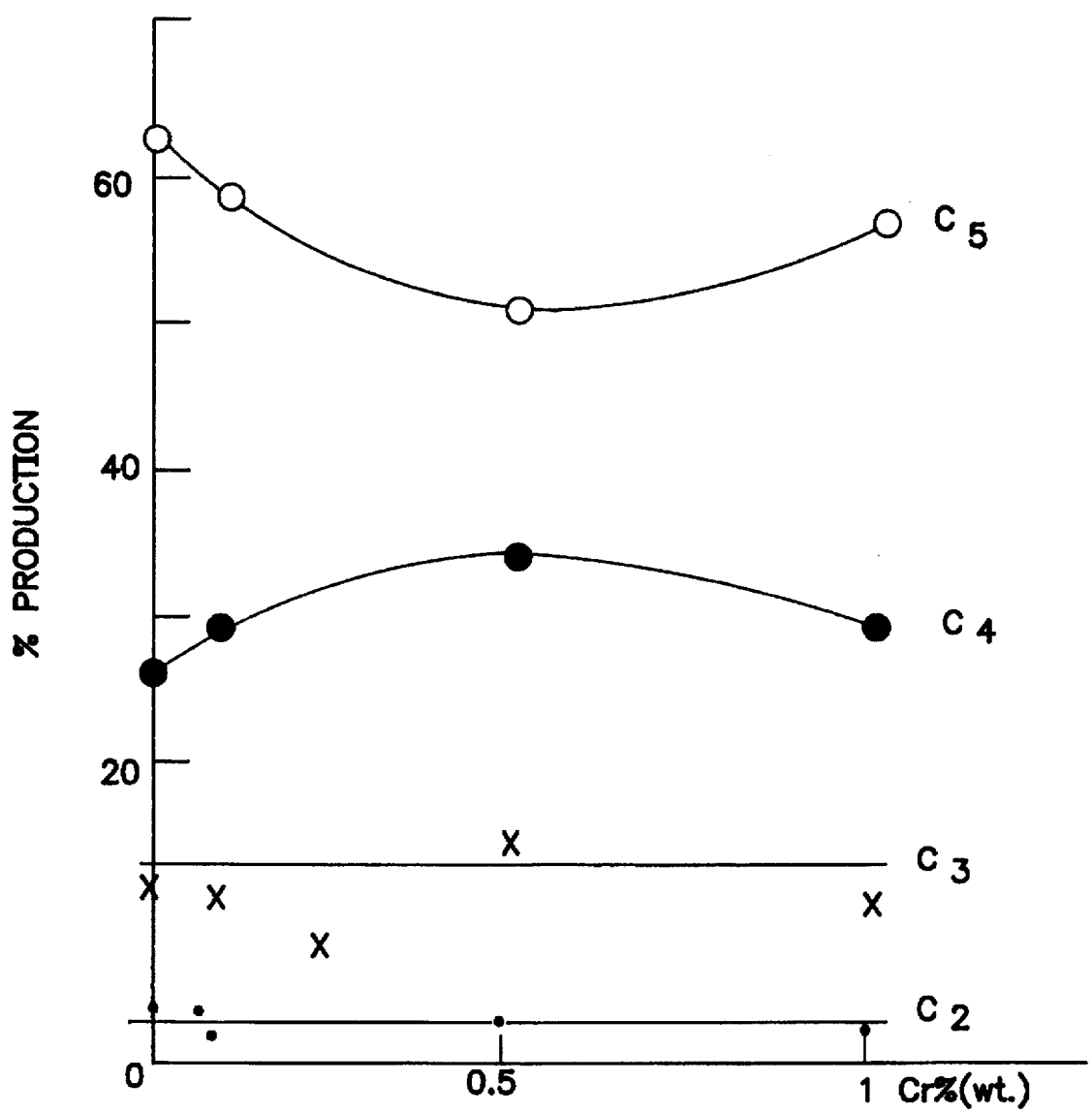
FIG. 2 illustrates the effect of chromium content on the composition of the product obtained from a treatment of n-heptane with a catalyst according to the invention.

The average value obtained for the activity of the catalyst is 2.7×10$^{-5}$ mol/s/g indicating that below 1.0% chromium, the density of the active sites of the catalyst remains unchanged. The reaction product composition, however, does show a significant difference. In FIG. 2 it can be observed that the $C_2$ and $C_3$ compounds remain constant while the $C_4$ compounds increase slightly as the metal concentration increases from 0 to 0.5% at the expense of a decrease of $C_5$+ compounds. This fraction is composed of paraffins, olefins, iso-paraffins, naphthenes and aromatics. No methane was detected.

The molar ratios of the products are listed below in Table 2. The results obtained confirm that the active site density in the catalyst is not affected by increasing the chromium concentration. There were no changes in the olefin/paraffins ratios, i.e.: $C_3$=/$C_3$, $C_4$=/$C_4$ and $C_5$=/$C_5$. There was also no change in the isoparaffins/paraffins molar ratio, i.e.: i–$C_4$=/n–$C_4$ and i–$C_5$=/n–$C_5$.

TABLE 2

| % Chromium | $C_3$=/$C_3$ | $C_4$=/$C_4$ | $C_5$=/$C_5$ | i–$C_4$=/n–$C_4$ | i–$C_5$=/n–$C_5$ |
|---|---|---|---|---|---|
| 0 | 0.31 | 0.85 | 1.6 | 0.37 | 0.48 |
| 0.1 | 0.22 | 0.61 | 1.1 | 0.50 | 0.58 |
| 0.5 | 0.25 | 0.66 | 1.2 | 0.45 | 0.54 |
| 1.0 | 0.23 | 0.63 | 1.2 | 0.42 | 0.50 |

Figure 3:
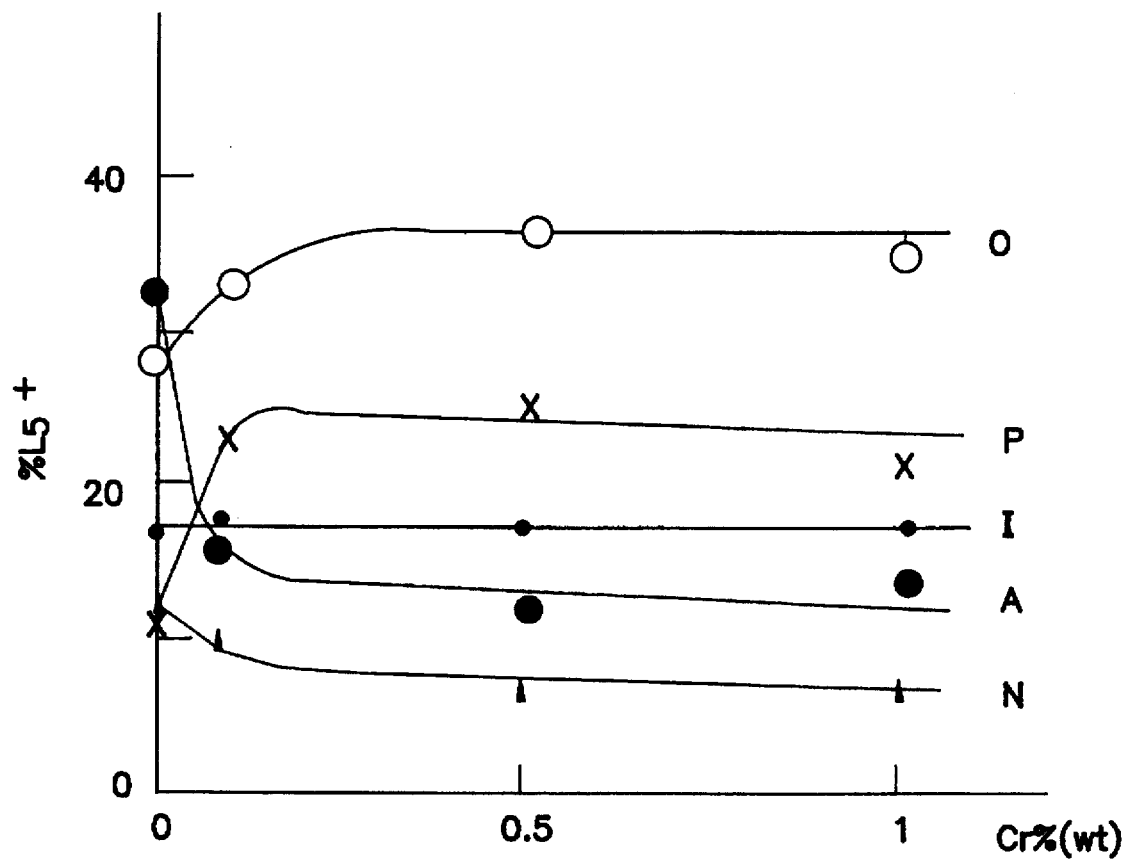
FIG. 3 illustrates the effect of chromium content on the composition of the liquid $C_5^+$ fraction obtained from a treatment of n-heptane with a catalyst according to the invention.
Figure 4:
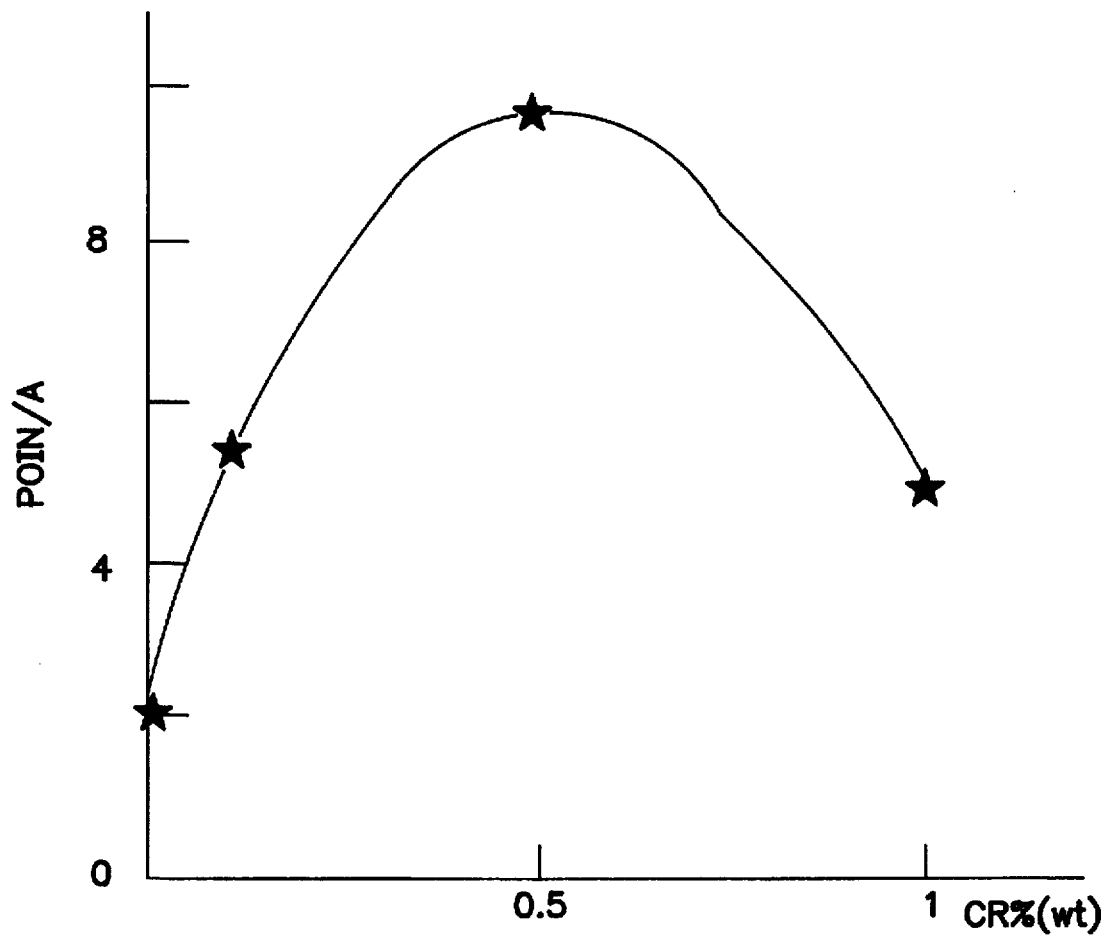
FIG. 4 illustrates the relation between the amount of chromium in a catalyst according to the invention and the products obtained when this catalyst is used to transform n-heptane.

The increase in chromium concentration in the catalyst did affect the composition of the $C_5$+ fraction. In FIG. 3 it can be seen that the composition of the $C_5$+ fraction is significantly affected by the variation in chromium content in the catalyst. The paraffin (P) and olefin (O) content increased approximately 12.5%. In the case of the naphthene content (N) there was a decrease of about 45.2% in the range tested. However, the aromatic content (A) of the product suffered a decrease of 58.0% as the metal content increased from 0 to 1.0%. FIG. 4 shows that the ratio of paraffins, olefins, iso-paraffins and naphthenes to aromatics (POIN/A) increases and reaches a maximum at a chromium content of about 0.5% by weight. The value obtained is about 5 times greater than that obtained for the catalyst with 0% chromium.

Table 3 illustrates the variation of the research octane number obtained for the conversions of n-heptane. For the case where the chromium concentration was 0.1% there was a decrease of 1.5 research octane numbers while the aromatic fraction octane contribution decreased about 56% with respect to the mixture obtained with the unmodified zeolite. The large decrease in the aromatic fraction did not significantly affect the octane number obtained for the mixture. When the chromium concentration was increased to 0.5% by weight, the research octane number decreased by 4.4 and the aromatic fraction decreased by 76.8% with respect to the mixture obtained with the unmodified HZSM-5 zeolite. In both cases the i- and n- light paraffins (C4 and C5) increased their contribution to the octane number as the aromatics decreased.

It is clear from Table 3 that, in the ranges shown, the contribution of the aromatic fraction to the research octane number is inversely proportional to the chromium content of the catalyst of the present invention.

TABLE 3

| | HZSM-5 | 0.1% Cr/HZSM-5 | 0.5% Cr/HZSM-5 |
|---|---|---|---|
| i–$C_4$ | 5.12 | 8.42 | 9.03 |
| o–$C_4$ | 10.00 | 11.00 | 13.40 |
| n–$C_4$ | 13.00 | 15.82 | 18.80 |
| i–$C_5$ | 2.76 | 5.52 | 4.90 |
| o–$C_5$ | 8.92 | 9.19 | 10.40 |
| n–$C_5$ | 3.92 | 6.20 | 6.10 |
| i–$C_6$ | 2.07 | 2.44 | 2.22 |
| o–$C_6$ | 5.37 | 4.14 | 3.26 |
| n–$C_6$ | 0.10 | 1.00 | 0.82 |
| i–$C_7$ | 2.16 | 0.94 | 1.13 |
| o–$C_7$ | 0.12 | 3.39 | 2.85 |
| A$^+_6$ | 26.50 | 11.69 | 6.16 |
| N$^+_7$ | 6.61 | 5.40 | 3.15 |
| Research Octane Number | 86.65 | 85.15 | 82.25 |

Figure 5:
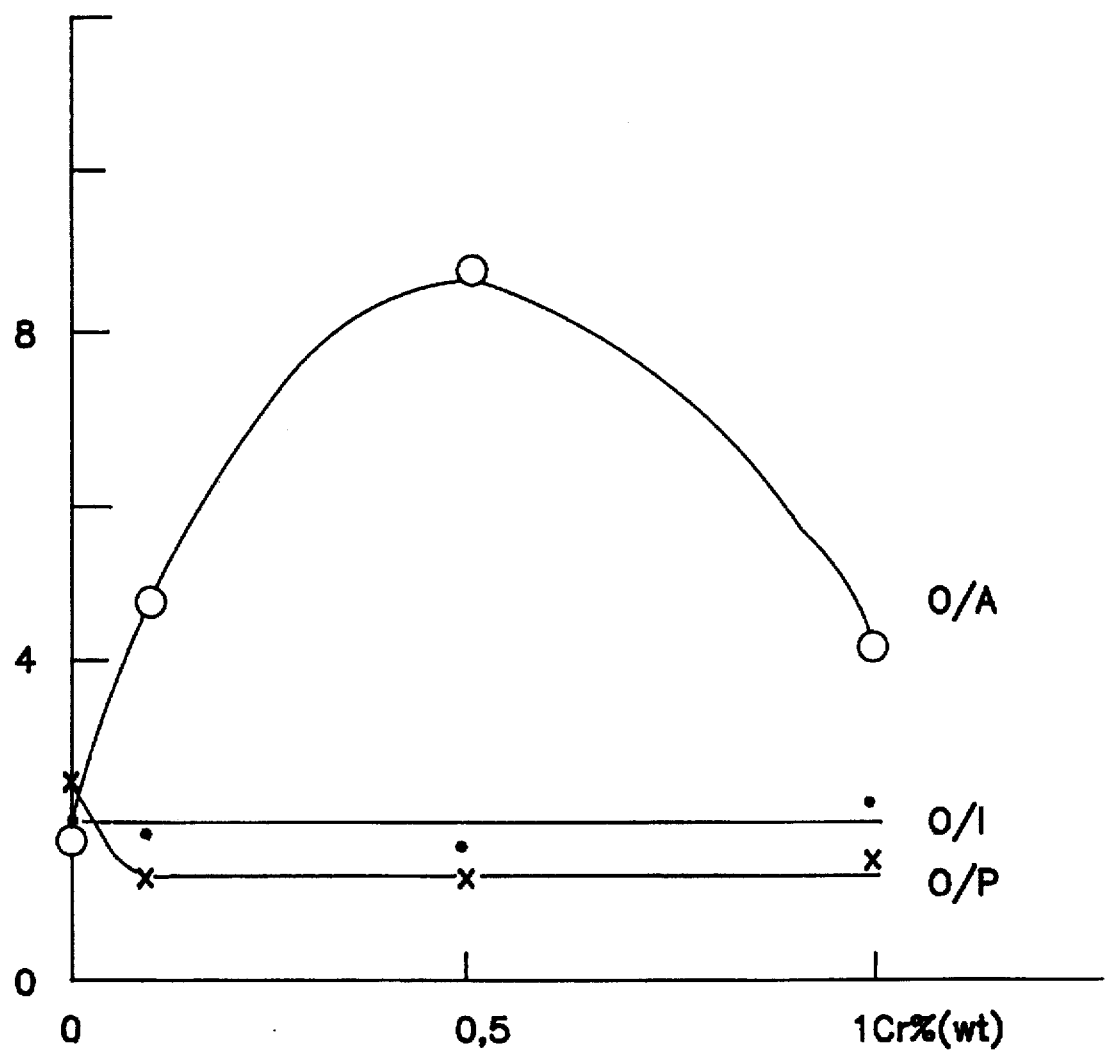
FIG. 5 illustrates the relation between the amount of chromium and specific molar ratios of the product.

The results obtained show that the chromium concentration used in the preparation of these catalysts inhibits the known aromatization reaction characteristic of HZSM-5 zeolite. Instead, an increase in the olefin content of the product and a reduction of the aromatic content is obtained. This is clearly observed in FIG. 5, where the olefin/ aromatics ratio can be observed to increase until a maximum is obtained when 0.5% chromium is used in the catalyst of this invention. The olefin/paraffin molar ratio decreases to a constant value over the same range indicating that the increase in chromium is favoring the formation of paraffins over olefins.

EXAMPLE 4

This example illustrates the effect of preparation in accordance with the process of the invention on the behavior of the catalyst. Three catalysts with 1.0% Cr/HZSM-5 were prepared. Catalyst A was impregnated with chromium salt without the use of the ammonium nitrate impregnation step and was calcined for 3 hours at 500° C. in accordance with conventional procedures. The second catalyst, catalyst B was prepared without ammonium nitrate impregnation and was calcined as described in Example 1. Catalyst C was prepared according to the invention as set forth in Example 1. The catalysts were tested as shown in Example 3.

In Table 4, the product distribution for the liquid $C_5+$ fraction (paraffins, olefins, isoparaffins, naphthenes, and aromatics) is shown. It can be clearly observed that the aromatic fraction obtained with catalysts A and B is more than two times that obtained with the catalyst of the invention (catalyst C).

TABLE 4

| Catalyst Used | A | B | C |
|---|---|---|---|
| Paraffins | 12.0 | 12.0 | 22.0 |
| Isoparaffins | 20.0 | 24.0 | 15.0 |
| Olefins | 18.0 | 18.0 | 36.0 |
| Naphthenes | 8.0 | 5.0 | 9.0 |
| Aromatics | 42.0 | 41.0 | 18.0 |

Thus, the ammonium impregnation step is clearly important in obtaining the improved catalyst in accordance with the invention.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for preparing a chromium containing zeolite catalyst for producing high octane number gasoline products having low aromatic content from a hydrocarbon feedstock containing n-paraffins, the process consisting essentially of the steps of:

providing a zeolite composition;

providing a solution of water soluble chromium salt in water having a chromium ion concentration sufficient to provide a desired concentration of chromium in said final catalyst of between about 0.1 to 1.0 wt.%;

providing a solution of water soluble ammonium salt in water wherein said ammonium solution has an ammonium ion concentration greater than said chromium ion concentration of said chromium solution;

impregnating said zeolite composition with said ammonium solution to provide an ammonium impregnated zeolite;

impregnating said ammonium impregnated zeolite with said chromium solution without intermediate treatment of the said ammonium impregnated zeolite to provide an ammonium/chromium impregnated zeolite;

drying said ammonium/chromium impregnated zeolite; and calcining said dried zeolite so as to provide said zeolite with pockets of chromium in $Cr^{3+}$ form at acidic sites of said zeolite catalyst.

2. A process according to claim 1, wherein said calcining step is carried out at a temperature of between about 450° C. to about 600° C. for a time sufficient to transform substantially all of said chromium to $Cr^{3+}$ form.

3. A process according to claim 2, wherein said drying step includes drying at a temperature below about 100° C. so as to remove free water, and further drying at a temperature below about 125° C. so as to decompose said chromium salt and said ammonium salt.

4. A process according to claim 3, wherein said zeolite composition is selected from the group consisting of ZSM-5, HZSM-5 and mixtures thereof.

5. A process according to claim 4, wherein said zeolite composition has a molar ratio of $SiO_2/Al_2O_3$ of at least about 46 and a surface area of about 360 $m^2/g$.

6. A process according to claim 1, wherein said chromium solution contains chromium sufficient to provide said catalyst with a chromium content by weight of the catalyst of between about 0.5% to about 0.75%.

7. A process according to claim 1, wherein said chromium solution contains chromium sufficient to provide said catalyst with a chromium content by weight of the catalyst of about 0.5%.

8. A process according to claim 1, wherein said chromium salt is selected from the group consisting of chromium nitrate, chromium oxalate, chromium acetate, chromium chloride and mixtures thereof.

9. A process according to claim 1, wherein said ammonium salt is selected from the group consisting of ammonium nitrate, ammonium acetate, ammonium oxalate and mixtures thereof.

* * * * *